US012190786B1

(12) United States Patent
Xiong et al.

(10) Patent No.: US 12,190,786 B1
(45) Date of Patent: Jan. 7, 2025

(54) SYSTEM AND METHOD TO SYNCHRONIZE ADAPTIVE LUMINANCE AND COLOR CONTROLS AMONG MULTIPLE DISPLAYS

(71) Applicant: Dell Products L.P., Round Rock, TX (US)

(72) Inventors: Dengzhai Xiong, Singapore (SG); Vui Khen Thien, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/385,748

(22) Filed: Oct. 31, 2023

(51) Int. Cl.
*G09G 3/20* (2006.01)

(52) U.S. Cl.
CPC ... *G09G 3/2096* (2013.01); *G09G 2320/0626* (2013.01); *G09G 2320/0666* (2013.01); *G09G 2360/144* (2013.01)

(58) Field of Classification Search
CPC ......... G09G 3/2096; G09G 2320/0626; G09G 2320/0666; G09G 2360/144
See application file for complete search history.

(56) References Cited

U.S. PATENT DOCUMENTS

2014/0232614 A1* 8/2014 Kunkel .................... H04N 9/67 345/1.1
2016/0133227 A1* 5/2016 Yoon ........................ G09G 3/14 345/593

OTHER PUBLICATIONS

"Dell U2722DE User's Guide", 2021, Dell (Year: 2021).*

* cited by examiner

*Primary Examiner* — Peter D McLoone
(74) *Attorney, Agent, or Firm* — Terrile, Cannatti & Chambers, LLP; Emmanuel A. Rivera

(57) ABSTRACT

Described are systems and methods to synchronize adaptive luminance and color controls of multiple displays. The displays are included in ambient light sensor (ALS) cluster that includes ALS equipped and non ALS equipped displays. An ALS equipped display is designed as primary display and the other displays are designed as follower displays. ALS equipped displays collect ALS readings which are used to determine luminance and color tone/Correlated Color Temperature (CCT). The determined luminance and CCT are arbitrated, and the arbitrated luminance and CCT are provided to the displays for use. The displays can be daisy chained, and the primary display collects, arbitrates, and provides the luminance and CCT. In certain implementations, an IHS (i.e., software on the IHS) collects, arbitrates, and provides the luminance and CCT.

20 Claims, 13 Drawing Sheets

| Ambient 402 | Display 1 404 | Display 2 406 | Display 3 408 | Arbitrated 410 |
|---|---|---|---|---|
| 0 | 10 | 20 | 30 | 30 |
| 50 | 10 | 20 | 30 | 30 |
| 100 | 40 | 50 | 60 | 60 |
| 400 | 180 | 200 | 240 | 240 |
| 600 | 250 | 300 | 350 | 250 |
| 1000 | 250 | 300 | 350 | 250 |

400

| Ambient 402 | Display 1 404 | Display 2 406 | Display 3 408 | Arbitrated 410 |
|---|---|---|---|---|
| 0 | 4500 | 3500 | 3000 | 4500 |
| 4500 | 4500 | 3500 | 3000 | 4500 |
| 5500 | 5500 | 5000 | 5000 | 5000 |
| 6500 | 6500 | 6500 | 6500 | 6500 |
| 7500 | 7500 | 9300 | 11000 | 7500 |
| 11000 | 7500 | 9300 | 11000 | 7500 |

500

SYSTEM AND METHOD TO SYNCHRONIZE ADAPTIVE LUMINANCE AND COLOR CONTROLS AMONG MULTIPLE DISPLAYS

BACKGROUND OF THE INVENTION

Field of the Invention

The present invention relates to information handling systems. More specifically, embodiments of the invention provide for synchronizing adaptive luminance and color controls of multiple displays of an information handling system.

Description of the Related Art

As the value and use of information continues to increase, individuals and businesses seek additional ways to process and store information. One option available to users is information handling systems (IHS). Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems (IHS) may include a variety of hardware and software components that may be configured to process, store, and communicate information and may include one or more computer systems, data storage systems, and networking systems.

Information handling systems (IHS), such as desktop computers and laptop/notebook computers, etc. can include or be connected to multiple displays, such as external monitors. Displays can implement ambient adaptive control, where an ambient light sensor (ALS) on a display measures ambient lighting. Algorithms (e.g., applications, software, firmware) can adjust a display's brightness and color tone/Correlated Color Temperature (CCT) according to the measured ambient lighting, such as though the use of a pre-calibrated look up table (LUT).

When two or more displays are connected to an IHS, inconsistent front of screen (FOS) user experience can result. Such FOS inconsistency or variance can be the result of the use of heterogenous displays, where one display may include an ALS and one display may not have an ALS. The ALS equipped display is able to adapt to ambient light, while the display without an ALS is not able to adapt to ambient light. If the connected displays are equipped with ALS, FOS inconsistency or variance can still result due to differences in light measurement and control behavior as implemented by the ALS equipped displays. For example, one ALS equipped display may have a different measurement of ambient light due to a different distance than another ALS equipped display. In another example, different algorithms may be employed by the ALS equipped displays. Ideally, connected displays should synchronize with one another as to brightness and color tone/correlated color temperature (CCT), and ALS measurement and control.

SUMMARY OF THE INVENTION

A method, system, and computer-readable medium for synchronizing adaptive luminance and color controls of multiple displays comprising identifying displays in an ambient light sensor (ALS) cluster; identifying which displays in the ALS cluster are ALS equipped and non ALS equipped; designating an ALS equipped display as a primary display of the ALS cluster; designating the other displays as follower displays of the ALS cluster; collecting ALS readings from the ALS equipped displays to determine luminance and color tone; arbitrating the determine luminance and color tone; and providing the arbitrated luminance and color tone to all the displays in the ALS cluster.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various implementations provide consistent user front of screen (FOS) experience with multiple information handling system (IHS) connected displays by arbitrating and sharing ambient light sensor (ALS) control information between the displays. ALS information can include target brightness (e.g., in nits) and correlated target brightness (e.g., in Kelvin).

Certain implementations include a software agnostic approach, where daisy chained (i.e., connected) displays independently arbitrate and exchange ALS control information. Other implementations include a software centric approach, where an ALS application can run on the IHS (i.e., client) to arbitrate, collect and share ALS control information to the connected displays.

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
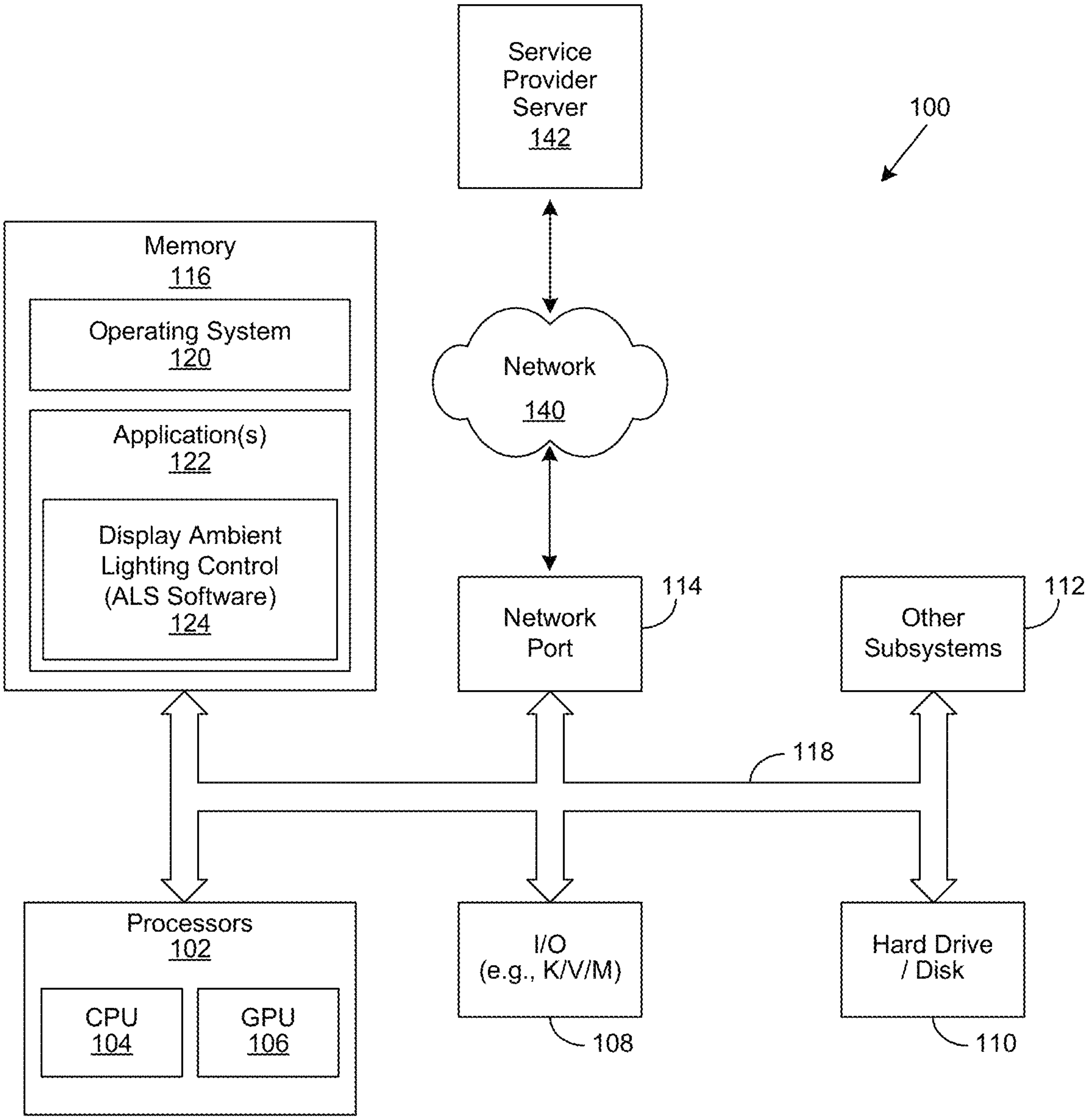
FIG. 1 is a general illustration of components of an information handling system (IHS) as implemented in the present invention.

FIG. 1 is a generalized illustration of an information handling system or IHS 100. The IHS 100 can be implemented as a computer, such as a desktop, server, tablet, laptop, or notebook, smartphone with built in camera and display, etc. The information handling system 100 includes processor(s) 102, such as a central processor unit or "CPU" 104 and a graphics processing unit or "GPU" 106. The information handling system 100 further includes input/output (I/O) devices 108, such as a microphone, a keyboard, a video/display, a mouse, and associated controllers (e.g., K/V/M), a hard drive or disk storage 110, and various other subsystems 112.

Various implementations provide for the I/O devices 108 to be external peripheral devices, such as keyboards, webcams, monitors, displays, etc. In particular, I/O devices 108 can include multiple ALS equipped and non ALS equipped displays connected to the IHS 100. Implementations provide for multiple displays to be connected or "daisy chained" through a DisplayPort cable where only one display is connected to the IHS 100.

Implementations provide for such external devices are connected using cables based on standards such as DisplayPort, universal serial bus (USB), including USB Type C.

In various embodiments, the information handling system 100 also includes network port 114 operable to connect to a network 140, where network 140 can include one or more wired and wireless networks, including the Internet. Network 140 is likewise accessible by a service provider server 142. The information handling system 100 likewise includes system memory 116, which is interconnected to the foregoing via one or more buses 118. System memory 116 can be implemented as hardware, firmware, software, or a combination of such. System memory 116 further includes an operating system (OS) 120. Embodiments provide for the system memory 116 to include application(s) 122. Application(s) 122 can include display ambient lighting control (ALS software) 124 which in various implementations performs processes as described herein.

An ALS cluster is defined as a group of displays to implement synchronized ALS control behavior information which includes target brightness and Correlated Color Temperature (CCT). Not all displays in the ALS cluster may be equipped with an ALS sensor, but at least one display in the ALS cluster is equipped with an ALS sensor. Displays in ALS cluster implement ALS algorithms that automatically discovers, enumerate and synchronize ALS information among supported displays.

ALS configurations can include display or monitor on-screen display settings that influence a display's response to changes in ALS input, such as maximum brightness which changes a brightness ceiling value of an ALS luminance curve, adaptive color that enables/disables changes in screen color temperature based on ALS input, and ALS primary that enables/disables a particular display as to acting as an ALS primary display in the ALS cluster.

ALS controls are targeted control levels that include display luminance, color tone, etc. which adapt to environmental measurement. The ALS primary is a display equipped with an ALS sensor that provides ALS controls to other displays in the ALS cluster. An ALS follower is a display that implements ALS control algorithms for target brightness color tone from the ALS primary to execute ALS controls.

Display daisy chain interfaces provide for video/display connectivity. As described above, interfaces such a DisplayPort (e.g., a DisplayPort cable) supports daisy chained connections between displays allow the transfer of video and audio, as well as control data. Protocols can be built on the control interface for propagating information across all displays on daisy chain. An example of such a protocol is the Dell Multi-Monitor Sync (i.e., MMS) which is used to share information between displays on a daisy chain, allowing ALS interactions and controls to establish communication on MMS protocol.

ALS control behaviors can include typical behaviors such as target screen luminance and color tone/correlated color temperature (CCT) under a range of ambient measurement, minimum and maximum levels of screen luminance and color tone that can be controlled, refined control mapping segments in different ambient measurement ranges, and control step size and speed for luminance and color temperature changes.

As discussed, implementations provide for the IHS 100 to include display ambient lighting control (ALS software) 124. Display ambient lighting control (ALS software) 124 facilitates synchronization among the displays.

Figure 2:
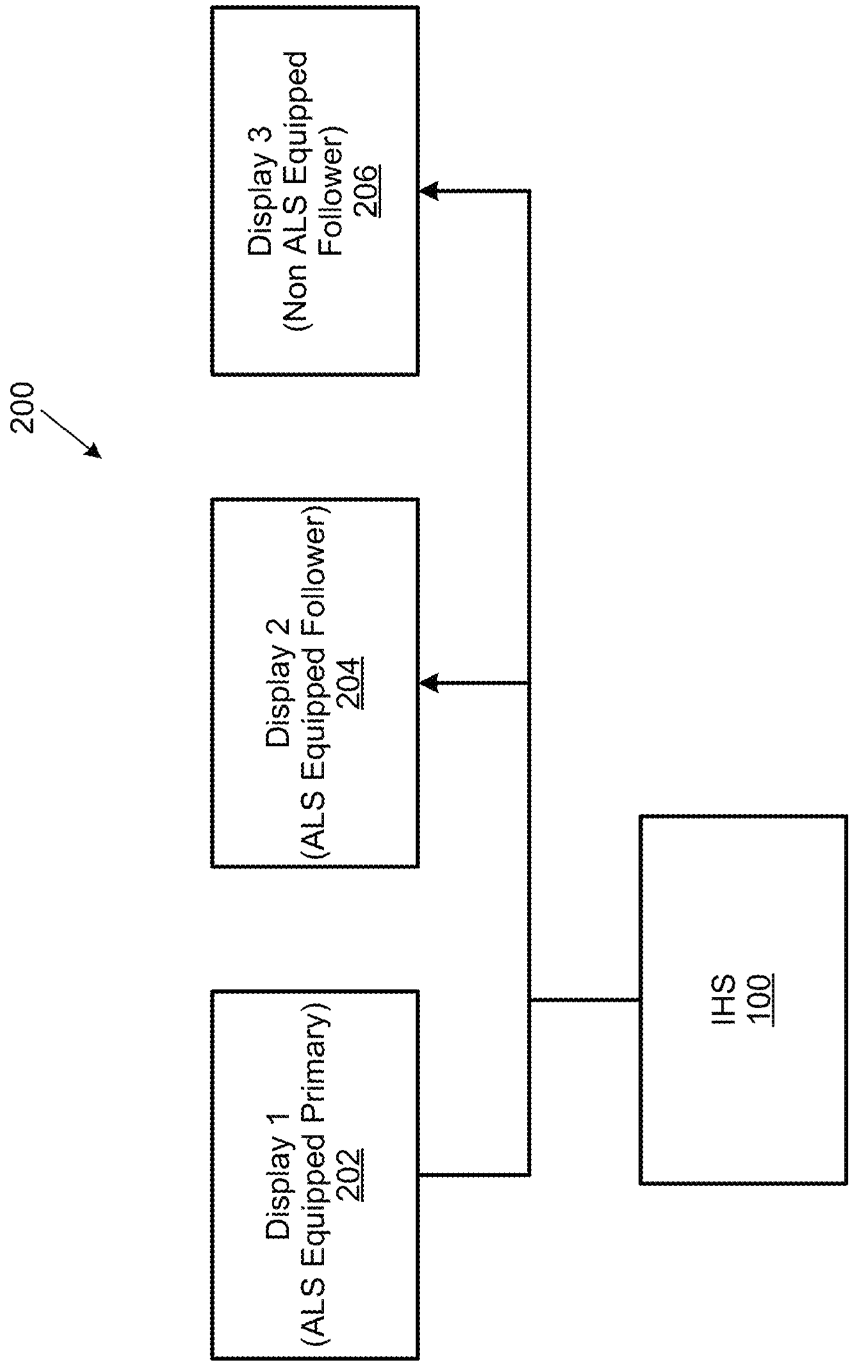
FIG. 2 illustrates an ambient light sensor (ALS) cluster or a group of displays.

FIG. 2 shows an example of an ALS cluster or a group of displays 200. The ALS cluster or group of displays 200 are implemented to provide synchronization of adaptive luminance and color controls. In this example, ALS cluster or group of displays 200 includes a display 1 202, display 2 204, and display 3 206. Each display 202, 204, and 206 can be implemented with processing units and memory to process and store ALS control information (e.g., algorithms) used to synchronize adaptive luminance and color controls.

Various configurations can be provided. For example, three example configurations can include multiple ALS equipped displays, multiple displays with a mix of ALS equipped displays and non ALS equipped displays, and multiple displays that are connected directly to an IHS, such as IHS 100, where at least one display is ALS equipped.

For the various configurations, a determination is performed as to a common adaptive ALS control behavior for the ALS cluster or group of displays 200. A primary ALS equipped display is elected for the ALS cluster or group of displays 200. Synchronization of ALS controls is performed either through a daisy chain connection/interface between display 1 202, display 2 204, and display 3 206 or by IHS 100 (i.e., include display ambient lighting control (ALS software) 124).

Display 1 202 is an ALS equipped display and is designed as the primary display in the ALS cluster 200. ALS readings from display 1 202 are used by algorithms by display 1 202 or IHS 100 to determine brightness (luminance) and correlated color temperature (CCT) controls. Display 2 204 may be ALS equipped, but acts a follower display. ALS readings from display 2 204 are not used by the algorithms of display 2 204. Display 2 204 uses target brightness (luminance) and color tone/correlated color temperature (CCT) from display 1 202 (acting as primary) to execute controls. Display 3 206 may be a non ALS equipped display and uses the target brightness (luminance) and color tone/correlated color temperature (CCT) from display 1 202 (acting as primary) to execute controls.

Figure 3:
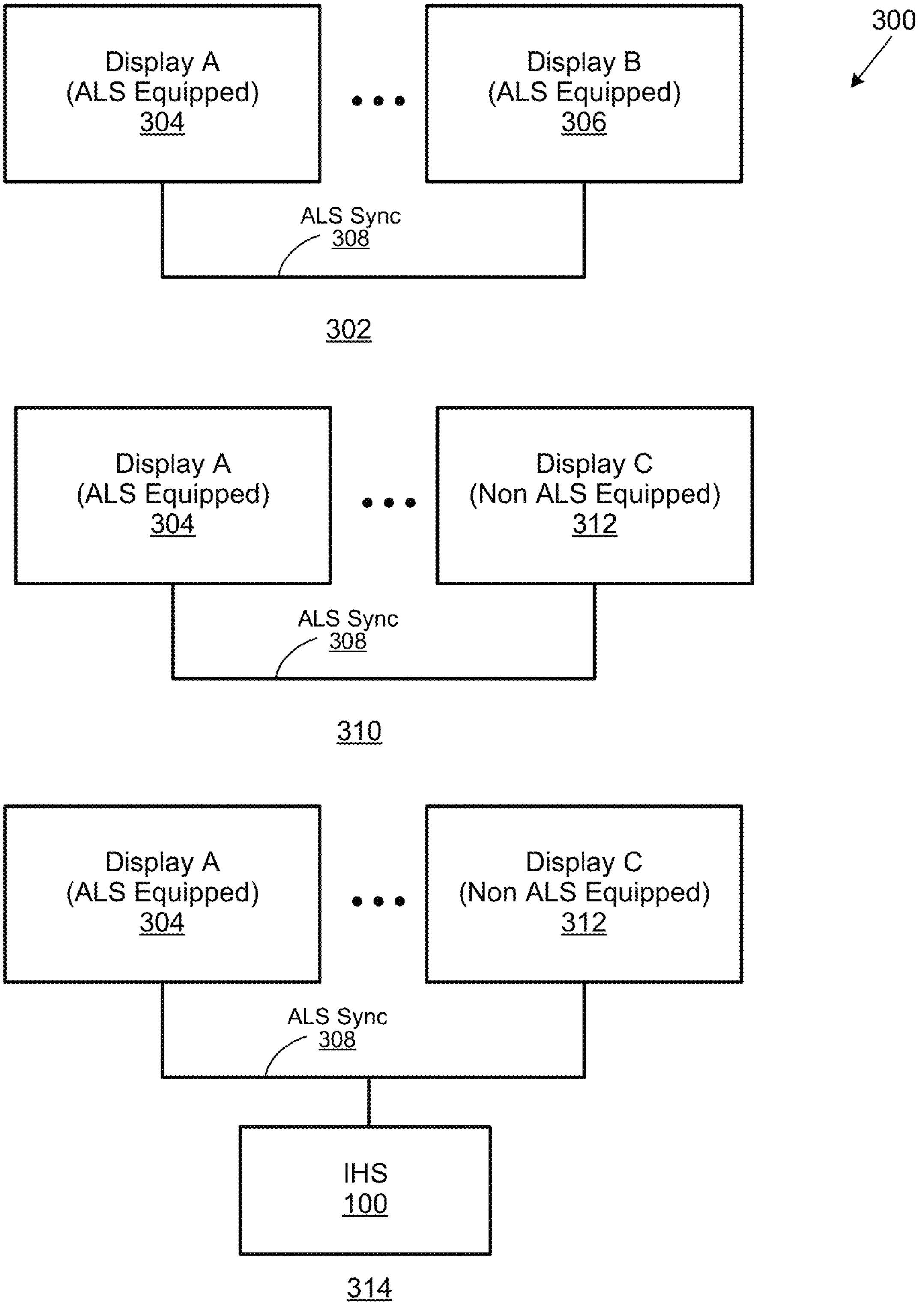
FIG. 3 illustrates various configurations of ambient light sensor (ALS) clusters.

FIG. 3 shows various configurations of ALS clusters 300. Configuration 302 illustrates multiple ALS equipped display A 304 to B 306. Configuration 302 may implement daisy chaining, where display A 304 to B 306 receive ALS synchronization 308. Configuration 310 illustrates a mix of ALS equipped display A 304 and non ALS equipped display C 312, where display A 304 and display C 312 receive ALS synchronization 308. Configuration 314 illustrates a mix of ALS equipped display A 304 and non ALS equipped display C 312, where display A 304 and display C 312 are connected to an IHS, such as IHS 100, Since displays may have different hardware configurations (i.e., hardware diversity), different displays may have different adjustable ranges for luminance and color tone or correlated color temperature (CCT). Therefore, displays may be designed with different luminance and color tone mapping curves for responding to the ambient lighting measurement. Common main parameters may be used to denote ALS control behaviors.

For certain implementations, the following can be used as essential or base parameters: a) Minimum luminance (Lum_min), max luminance (Lum_max), in nits; b) Minimum correlated color temperature (CCT_min), maximum correlated color temperature (CCT_max), in Kelvin; c) Luminance control step size (Lum_step), in nits and speed (Lum_speed), in nits/sec; d) Correlated color temperature control step size (CCT_speed), in Kelvin and speed (CCT_speed), in Kelvin/sec; e) ALS role: ALS Primary or ALS Follower.

Certain implementations can make use of an ALS Control behavior data set with the following example advanced parameters: a) luminance control multi-segment mapping points (Lum_1 . . . n) color temperature control multi-segment mapping points (CCT_1 . . . n).

The following describes ALS cluster forming and arbitration of control behaviors. For displays in a daisy chain, such as illustrated in configuration 302 and configuration 310. The following steps are performed. For step 1, broadcasting of ALS ability and control behaviors is performed. For step 1, when a new display is attached to the display daisy chain, an upstream display attempts to discover downstream display's ALS capability and a protocol (e.g., MMS). The downstream display receives ALS configuration information via the MMS package message from the upstream display and joins into the ALS cluster. The downstream display sends its ALS behavior data set:: essential parameters to upstream displays via message on the daisy chain and performs arbitration as described in the following step 2.

For step 2, the upstream display arbitrates the following control parameters: Lum_min, Lum_max, CCT_min and CCT_max, Lux_step, Lux_speed and CCT_step, CCT_speed by comparing with the current parameters. Parameter values of Lum_min and CCT_min are replaced with the received parameters if the received parameters are higher. The parameters Lum_max and CCT_max, lum_step, Lum_speed, CCT_step and CCT_speed are replaced with the received parameters if the received parameters are lower.

For step 3, the upstream display propagate (upstream/downstream) the information from step 2, if there are changes to the displays in the chain, which receive the newly arbitrated ALS behavior data set:: essential parameters.

The following describes ALS cluster forming and arbitration of control behaviors. For displays connected to an IHS, such as IHS 100, as illustrated in configuration 314. The following steps are performed. For step 1, when a display is connected, the ALS software (e.g., display ambient lighting control (ALS software) 124) of IHS 100 queries the display as to its ALS Control behavior data set.

For step 2, the ALS software of IHS 100 arbitrates the following control parameters: Lum_min, Lum_max, CCT_min and CCT_max, Lux_step, Lux_speed and CCT_step, CCT_speed by comparing with the current parameters. Parmenter values of Lum_min and CCT_min are replaced with the received parameters if the received parameters are higher. The parameters Lum_max and CCT_max, lum_step, Lum_speed, CCT_step and CCT_speed are replaced with the received parameters if the received parameters are lower.

For step 3, the ALS software of IHS 100 sends updated ALS Control behavior data set to all connected displays.

Figure 4:
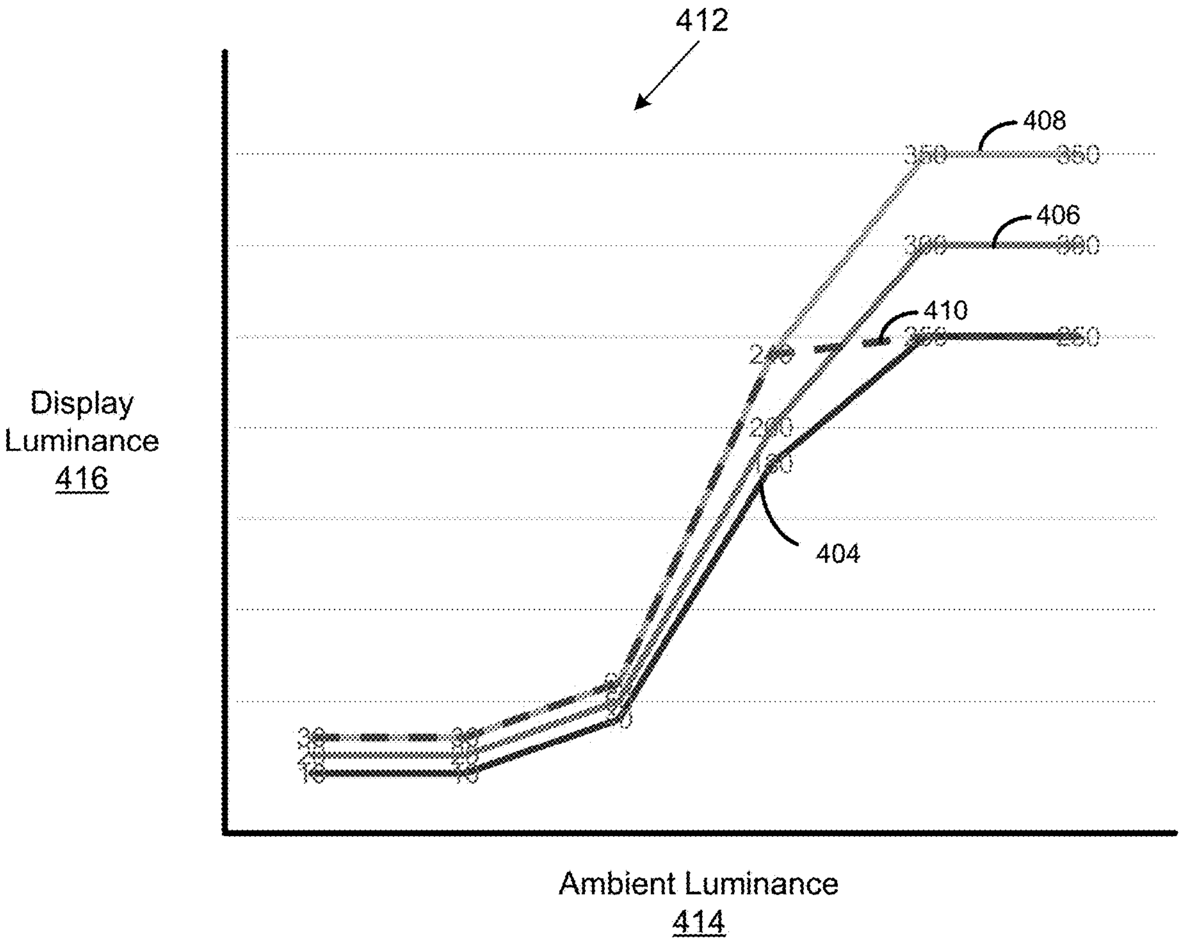
FIG. 4 illustrates arbitrated luminance control behaviors.

FIG. 4 shows example arbitrated luminance control behaviors. Table 400 is an example of arbitrated luminance mapping points of three displays. Table 400 lists control ranges and turning points. Ambient luminance 402 values are shown with values of display 1 404, display 2 406, display 3 408, and arbitrated value 410. Advance parameters can follow display 3 408 as a primary, where in-between control points follow a current primary display (e.g., display 3 408). Control step size and speed can also a current primary (e.g., display 3 408).

Graph 414 shows arbitrated luminance controls of display 1 404, display 2 406, and display 3 408. Graph 414 plots ambient luminance 414 versus display luminance 414 of the display 1 404, display 2 406, display 3 408, and arbitrated value 410. Arbitration of common control behaviors can be based on common achievable parameters. In graph 412 the line representing arbitrated value 410 represents arbitrated control behaviors, where maximum luminance (Lum_max) is 30 nits and minimum luminance (Lum_min) is 250 nits.

Figure 5:
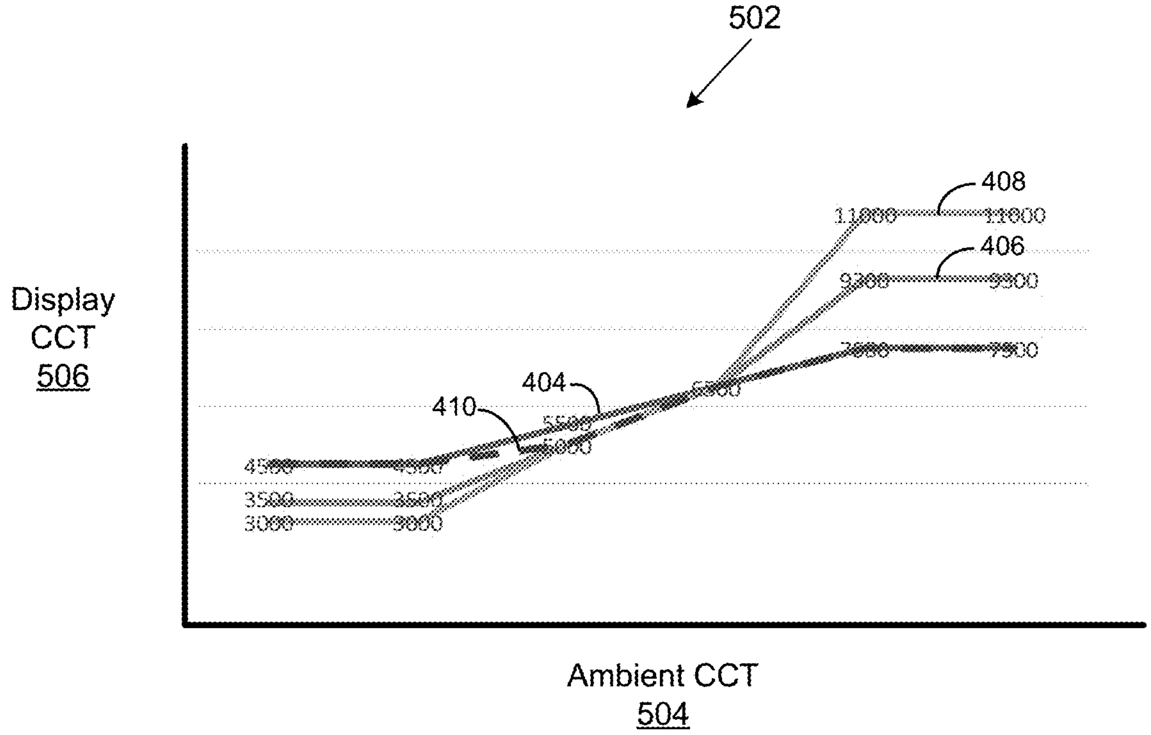
FIG. 5 illustrates arbitrated control tone/correlated color temperature (CCT) control behaviors.

FIG. 5 shows example arbitrated Correlated Color Temperature (CCT) control behaviors. Table 500 is an example of arbitrated CCT mapping points of three displays. Table 500 lists control ranges and turning points. Ambient CCT 402 values are shown with values of display 1 404, display 2 406, display 3 408, and arbitrated value 410. Advance parameters can follow display 3 408 as a primary, where in-between control points follow a current primary display (e.g., display 3 408). Control step size and speed can also follow a current primary (e.g., display 3 408).

Graph 502 shows arbitrated CCT controls of display 1 404, display 2 406, and display 3 408. Graph 502 plots ambient CCT 504 versus display CCT 506 of the display 1 404, display 2 406, display 3 408, and arbitrated value 410. Arbitration of common control behaviors can be based on common achievable parameters. In graph 502 the line representing arbitrated value 410 represents arbitrated control behaviors, where maximum color temperature (CCT_min) is 4500 Kelvin and minimum color temperature (CCT_max) is 7500 Kelvin.

Figure 6:
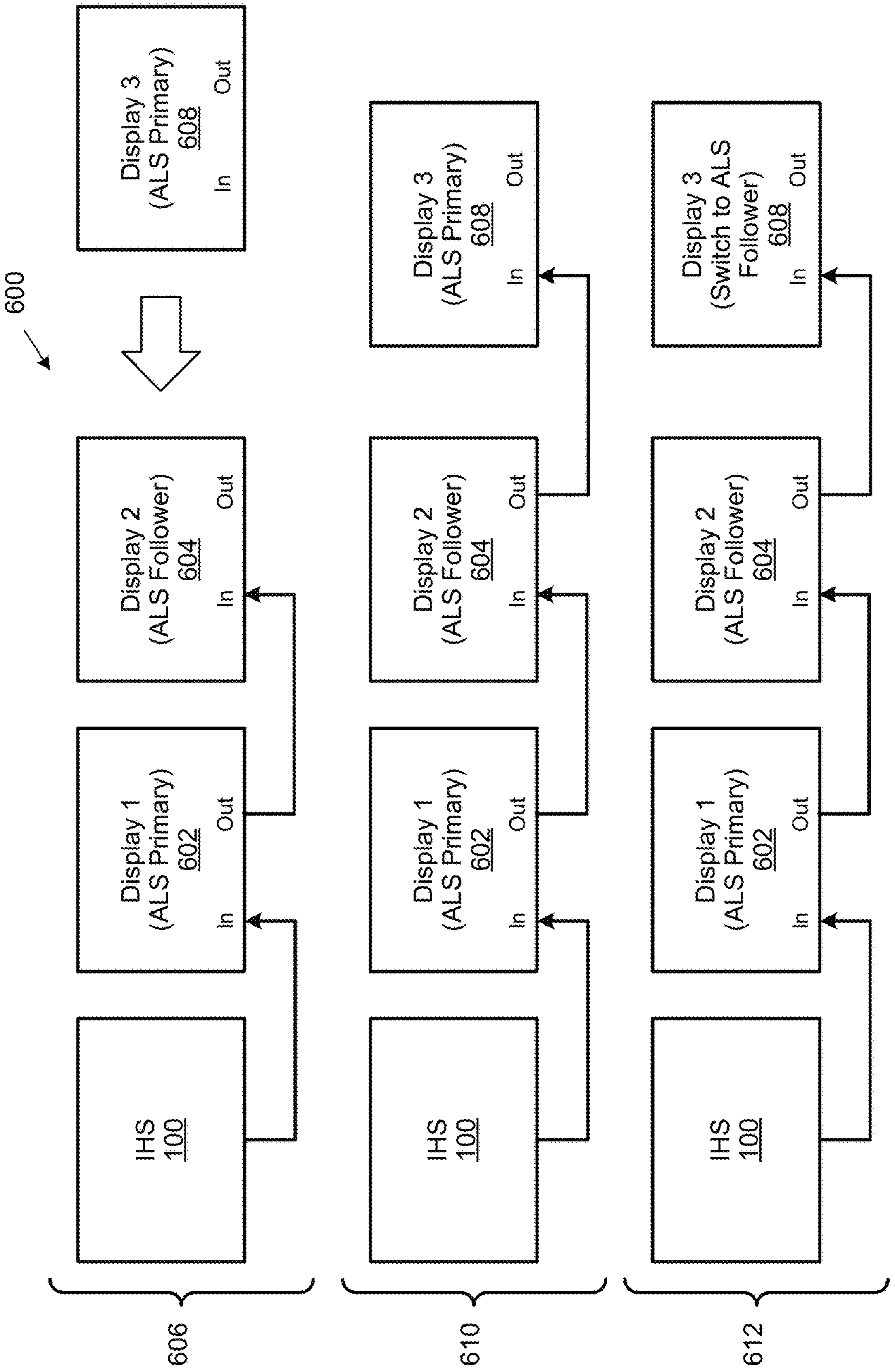
FIG. 6 illustrates ambient light sensor (ALS) cluster forming and arbitration for daisy chained displays.

FIG. 6 shows an example of ALS cluster forming and arbitration for daisy chained displays. ALS cluster forming and arbitration 600 includes multiple daisy chained connected displays represented by display 1 602 and display 604, which can be connected to IHS 100.

In configuration 606, an initial ALS cluster includes display 1 602 and display 2 604, where a display 3 608 is to join the ALS cluster. In this configuration 606, display 1 602 is an ALS primary, and display 2 604 is an ALS follower. Display 3 608 is an ALS a primary, but is not included in the ALS cluster.

In configuration 610 (e.g., step following configuration 606), display 2 604 connects to display 3 608. The display 2 604 sends a message with an ALS discovery request to display 3 608. The display 3 608 in turn replies to display 2 604 with a message as to its ALS capability. The display 2 604 sends a message with ALS configuration, disables display 3 608 as a primary, and requests ALS behavior data set:: essential parameters.

In configuration 612 (e.g., step following configuration 606), display 1 602 display 2 604, and display 3 608 are connected. The display 3 608 replies to display 2 604 with ALS behavior data set:: essential parameters. Display 2 604 arbitrates the following essential parameters: Lum_min, Lum_max, CCT_min and CCT_max, Lux_step, Lux_speed, CCT_step, CCT_speed with comparison of current parameters of display 1 602 display 2 604, and display 3 608. If different than current arbitrated essential parameters, the arbitrated essential parameters from this step, are propagated upstream from display 2 604 to display 1 602, and propagated downstream from display 2 604 to display 3 608.

Figure 7:
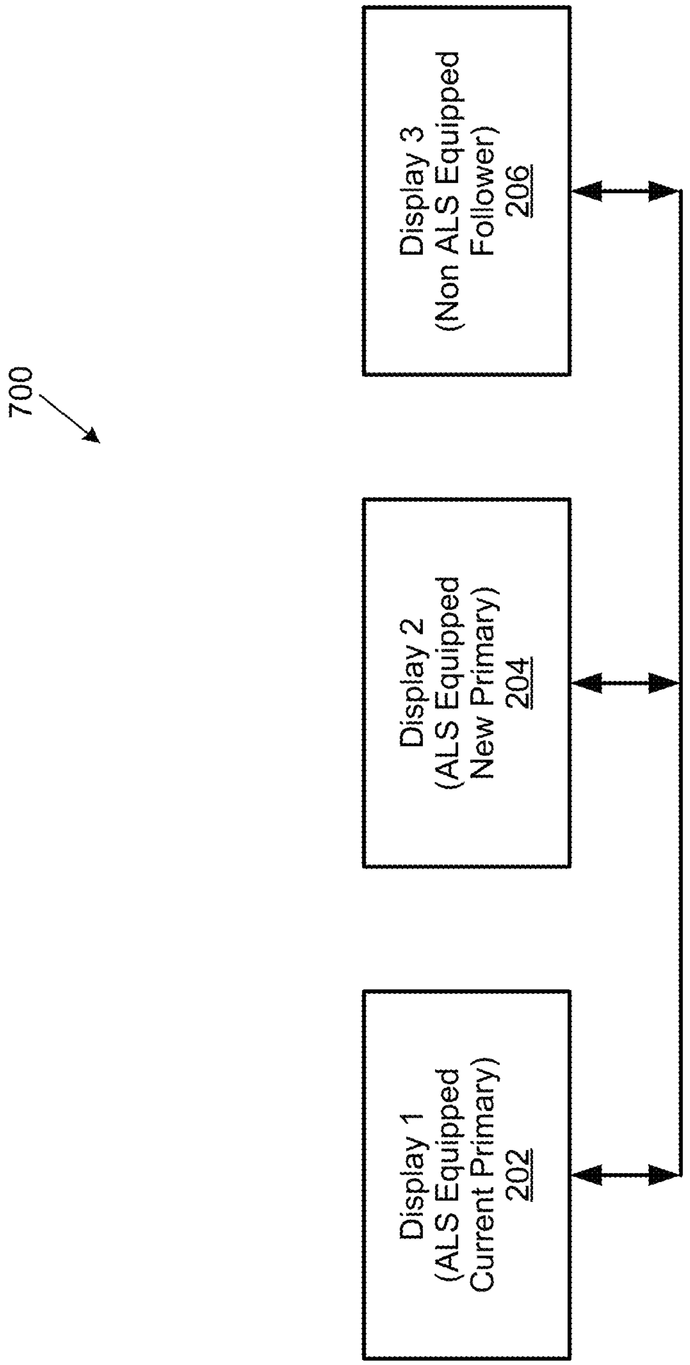
FIG. 7 illustrates messaging and propagation of primary display change in daisy chain of displays.

FIG. 7 shows messaging and propagation of primary display change in daisy chain of displays. The group of displays 700 represents an ALS cluster, and is similar to the ALS cluster or group of displays 200 as described in FIG. 2. Display 1 202, display 2 204, and display 3 are daisy chained connected, and may also be connected to an IHS, such as IHS 100 (not shown).

In an initial configuration, as shown in FIG. 2, the display 1 202 is a primary display of the ALS cluster, and the display 204 is a follower display of the ALS cluster. In implementations, only one display of an ALS cluster is designated as a primary display. The other displays in the ALS cluster are follower display. The primary display is ALS equipped.

An ALS primary display measures ambient light, calculates a desired display luminance and color tone/Correlated Color Temperature (CCT), and communicates target luminance and CCT controls to follower displays.

Selection of a primary ALS display in a daisy chain, can be through selection by a user, such as by a display's on screen display (OSD) menu. An OSD menu can also assist the user to review individual displays in the ALS cluster and choose a preferred primary ALS display.

In certain implementations, auto selection may be performed based a default criteria. The auto selection/default criteria can be performed based on minimum, maximum measurement in a short evaluation phase to select a primary display. The user can select a workflow condition (e.g., dark room editing/productivity/etc.) that is used for an auto-selection algorithm. In certain implementations, a virtual primary selection can be performed by averaging measurements of all ALS displays.

When a new ALS primary display is chosen, the following takes place. For example, display 2 204 is selected as a new ALS primary display. Display 1 202 is a current ALS primary display. Display 3 206 continues to be a follower display.

A message/instruction is sent to display 1 202 and display 3 206 to turn off as a ALS primary display. Display 1 202 is switched to a follower display mode. Display 2 204 becomes the new ALS primary display.

Figure 8:
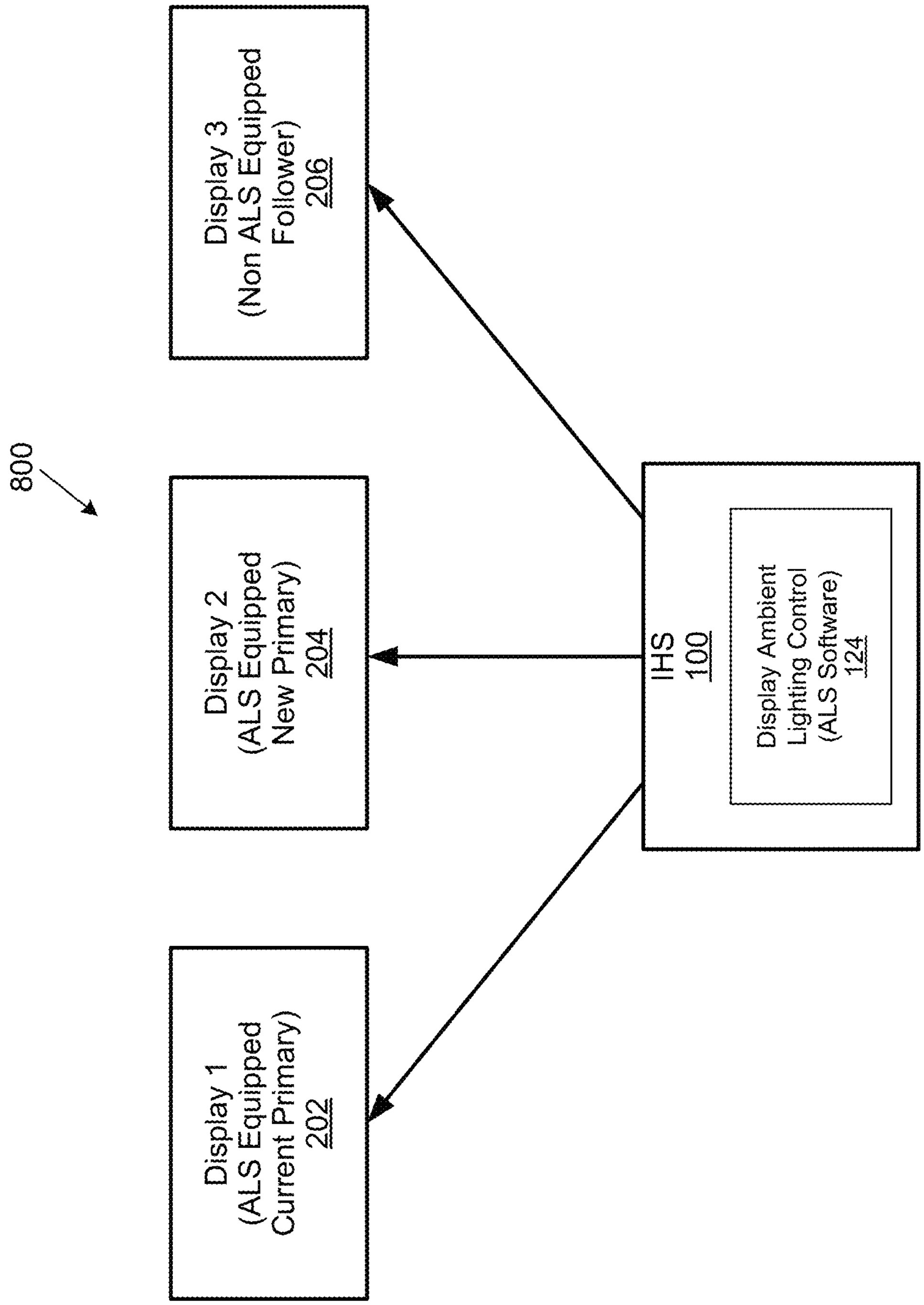
FIG. 8 illustrates messaging and propagation of primary display change by auto selection through software of an information handling system (IHS)

FIG. 8 shows messaging and propagation of primary display change by auto selection through software of an IHS. The group of displays 800 represents an ALS cluster, and is similar to the ALS cluster or group of displays 200 and 700 as described respectively in FIG. 2 and FIG. 7. Display 1 202, display 2 204, and display 3 are connected to IHS 100.

In an initial configuration, as shown in FIG. 8, the display 1 202 is a primary display of the ALS cluster, and the display 204 is a follower display of the ALS cluster. In implementations, only one display of an ALS cluster is designated as a primary display. The other displays in the ALS cluster are follower display. The primary display is ALS equipped.

In a real time workflow implementation, selection of a primary display can be based on the proceeding working, and performed using the display ambient lighting control (ALS software) 124 of the IHS 100.

For various implementations, selection of ALS primary display and ALS controls can be adaptive. For example, in certain implementations, selection of ALS primary display and ALS controls can be based on location where a user is working, and to use a display based on the location. In another example, selection of ALS primary display and ALS controls can be based on an application (program) that is being used/shown on the display(s). For such implementations, predefined luminance and CCT range that works best for the application can be chosen. Furthermore, adaptive brightness or adaptive color can be switched off if the application is color critical. In certain implementations, time of day can affect lighting conditions of displays. Selection primary ALS primary display and ALS controls can be based on such time of day can affect lighting conditions.

In an example, auto-select algorithm implemented on display ambient lighting control (ALS software) 124 is used to select display 2 204 as the new ALS primary display. The auto-select algorithm (i.e., display ambient lighting control (ALS software) 124) can considered or account for the conditions described above. Message/instruction is sent to display 2 204 to turn on as the ALS primary display. Message/instruction is sent to display 1 202 and display 3 206 to turn off as ALS primary display. Display 2 204 becomes the new ALS primary display.

Figure 9:
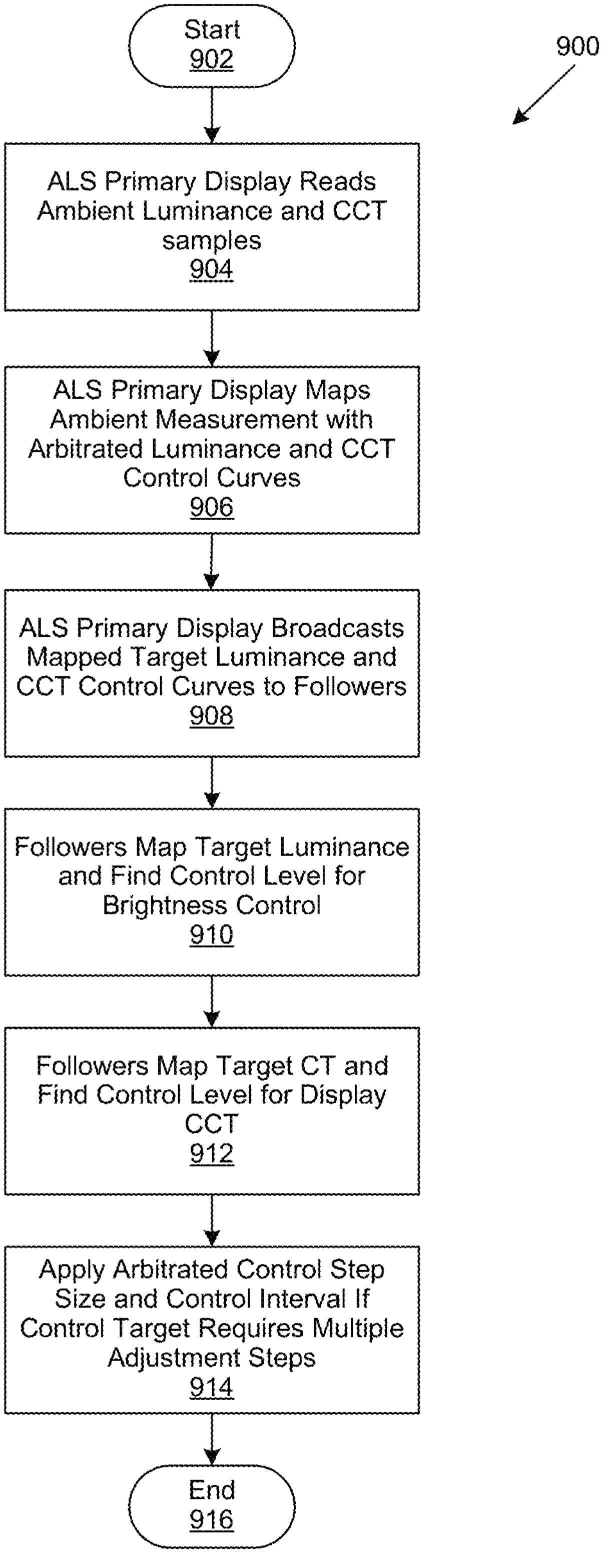
FIG. 9 is a generalized flowchart for arbitrating ambient light sensor (ALS) control behaviors.

FIG. 9 is a generalized flowchart for arbitrating ALS control behaviors, which is part of synchronizing ALS controls over ALS clusters. After an ALS cluster is set up and the ALS control behaviors are arbitrated, an ALS primary display can use the arbitrated ALS control ranges to map out ALS luminance and CCT controls, and broadcasts to all displays of the ALS cluster. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 902, the process 900 begins. At step 904, the ALS primary display reads ambient luminance and CCT measurement samples. This can be performed by the ALS of the ALS primary display based on a sampling rate.

At step 906, the ALS primary display maps the ambient measurement with the arbitrated luminance and CCT control curves (as described above). This can be performed using arbitrated ALS control behavior set.

At step 908, the ALS primary display broadcasts the mapped target luminance control and target CCT control to follower displays of the ALS cluster.

At step 910, the follower displays of the ALS cluster map the target luminance, which can be in a nits-based-brightness curve. The follower displays further find control level as to display brightness control function block (e.g., via a lookup table that maps target luminance to a pulse width modulation value).

At step 912, the follower displays of the ALS cluster map target CCT in the CCT control curve to find a control level for display CCT function (e.g., via a lookup table that maps target CCT to an RGB gain of a 3×3 matrix).

At step 912, if control target requires multiple adjustment steps to reach current levels, then arbitrated control step size and the control interval (derived from the control speed) can be applied. At step 916, the process 900 ends.

Figure 10:
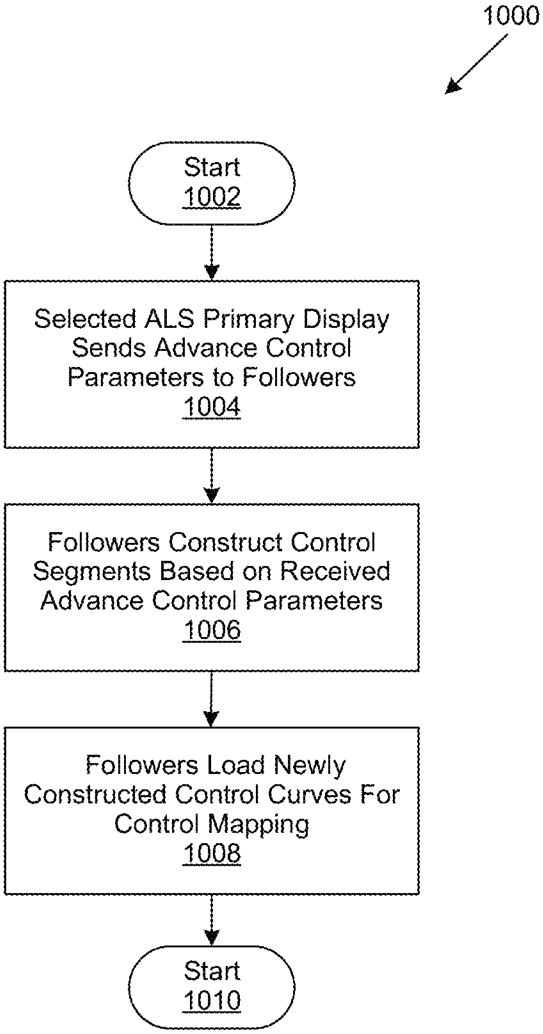
FIG. 10 is a generalized flowchart for transferring optional advance control behavior parameters to follower displays.

FIG. 10 is a generalized flowchart for transferring optional advance control behavior parameters to follower displays. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 1002, the process 1002 begins. At step 1004, a selected ALS primary display, which can be a newly selected ALS primary display, sends follower displays advanced control parameters, which can follow a primary role change command.

At step 1006, based on the received advance behavior parameters, the follower displays construct control segments with the parameters as in-between intermittent points.

At step 1008, follower displays load the newly constructed control curves for control mapping. At step 1010, the process 1000 ends.

Figure 11:
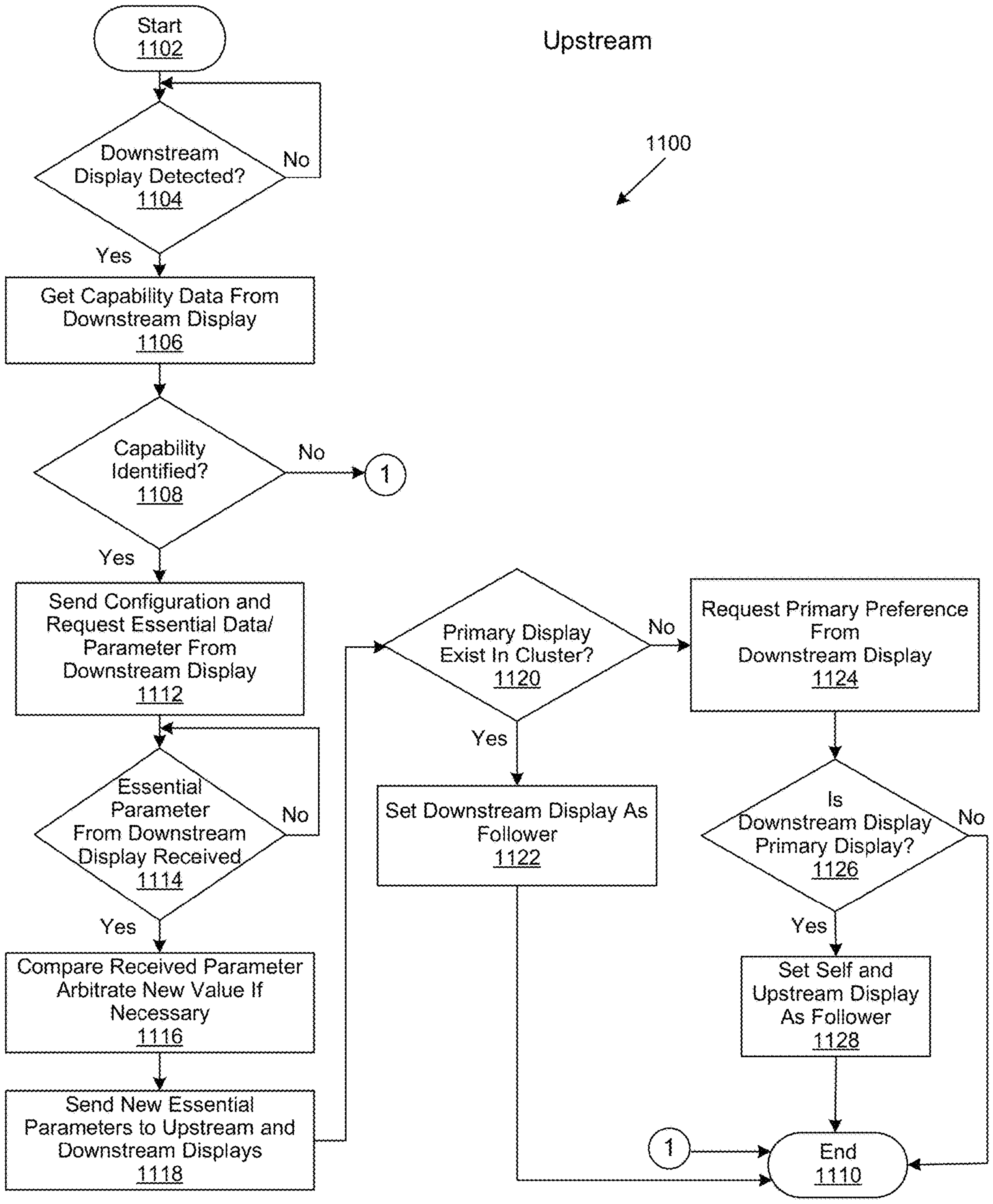
FIG. 11 is a generalized flowchart for upstream displays in an ambient light sensor (ALS) cluster.

FIG. 11 is a generalized flowchart for upstream displays in an ALS cluster. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 1102, the process 1100 starts. At step 1104, a determination is performed if a downstream display is detected. If a downstream display is not detected, following the No branch of step 1104, the process 1100 loops back to step 1104. If a downstream display is detected, following the Yes branch of step 1104, at step 1106, ALS capability data is requested and received from the downstream display. A message with ALS capability request can be used. A reply from the downstream display can be a message with the ALS capability data.

At step 1108, if ALS capability is not identified, then following the No branch of step 1108, then at step 1100 the process 1100 ends. If ALS capability is identified, then following the Yes branch of step 1108, step 1112 is performed. At step 1112, ALS configuration and request for essential parameter data is sent to the downstream display. A message with configuration and essential parameter data request can be used. A reply from the downstream display can be a message with the essential parameter data.

At step 1114, a determination is performed if essential parameter data from downstream display is received. If essential parameter data is not received, following the No branch of step 1114, the process 1100 loops back to step 1114. If essential parameter data is not received, following the Yes branch of step 1114, at step 1116, the received essential parameter data is compared, and arbitration is performed if necessary. At step 1118, new essential parameters (arbitrated) are sent to upstream and downstream monitors.

At step 1120, a determination is performed if an ALS primary display exists in the ALS cluster. If there is an ALS primary display, then following the Yes branch of step 1120, at step 1120, the downstream display is set as a follower. At step 1110, the process 1100 ends. If there is no ALS primary display existing in the ALS cluster, then following the No branch of step 1120, step 1124 is performed.

At step 1124, a request is sent to the downstream display as to an ALS primary display preference, if necessary. A message with the request can be sent.

At step 1126, determination is performed if downstream display has been previously set as the ALS primary display before joining the ALS cluster. If the downstream display has not been set as the ALS primary, then following the No branch of step 1126, at step 1110 the process 1100 ends.

If the downstream display has been set to be the ALS primary, then following the Yes branch of step 1126, at step 1128, the display sets itself and its upstream display as a follower displays. At step 1110, the process 1100 ends.

Figure 12:
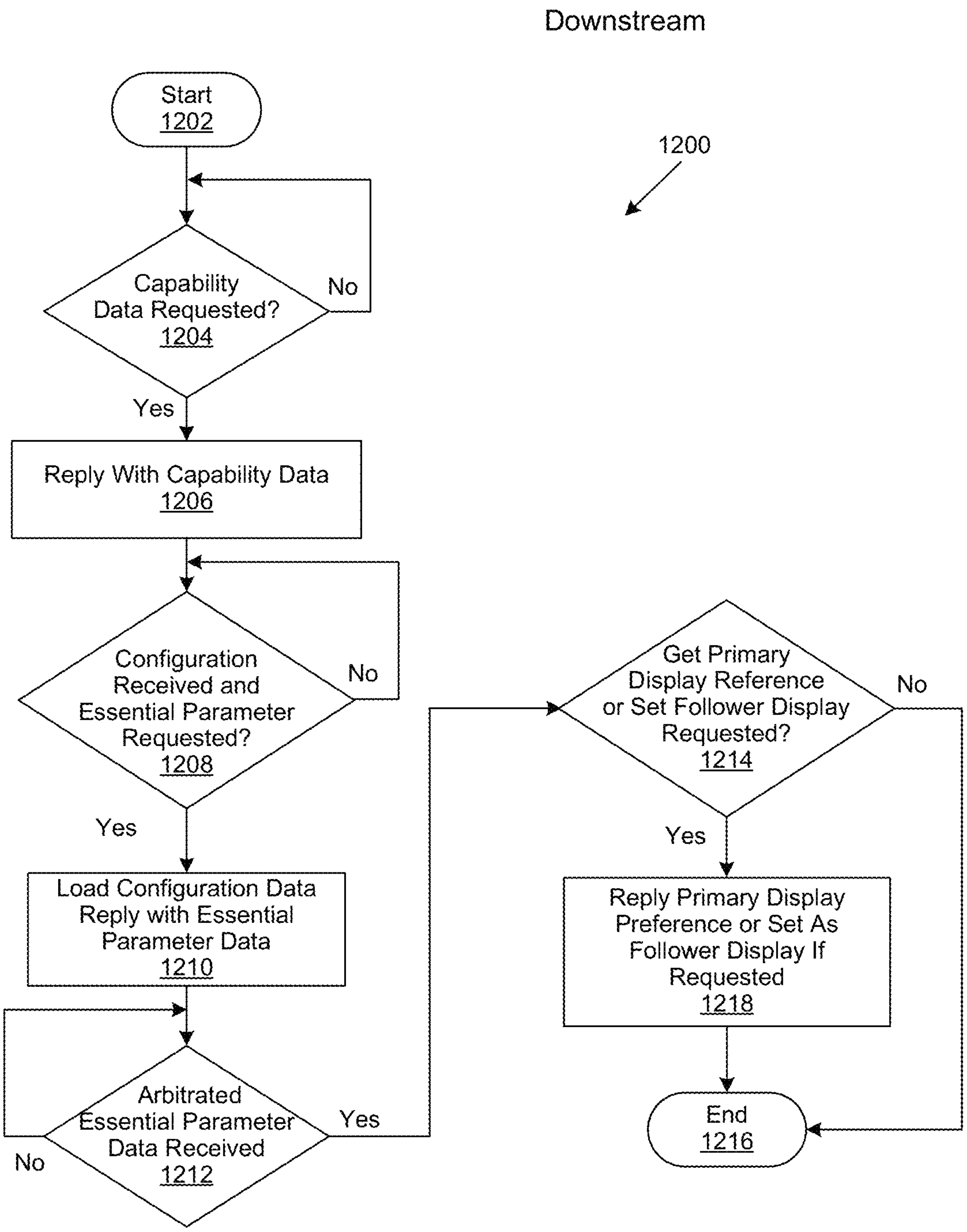
FIG. 12 is a generalized flowchart for downstream displays in an ambient light sensor (ALS) cluster.

FIG. 12 is a generalized flowchart for downstream displays in an ALS cluster. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 1202, the process 1200 starts. At step 1204, a determination is made if ALS capability data is requested from an upstream display. A message with ALS capability request can be received. If ALS capability data is not requested, following the No branch of step 1204, the process 1200 loops back to step 1204.

If ALS capability data is requested, then following the Yes branch of step 1204, at step 1206, a reply is sent with ALS capability data. The replay can be sent through a message with the ALS capability data.

At step 1208, a determination is made if ALS configuration and request for essential parameter data is received from upstream display. A message with configuration and essential parameter data request can be used. If configuration and essential parameter data is not received, following the No branch of step 1208 the process 1200 loops back to step 1208.

If configuration and essential parameter data is received, then following the Yes branch of step 1208, at step 1210, loading of the configuration data and essential data is performed. A reply with the essential data may be sent to the upstream display.

At step 1212, a determination is made if arbitrated essential data from upstream display is received. If arbitrated essential data is not received, following the No branch of step 1212 the process 1200 loops back to step 1212.

If arbitrated essential parameter data is received, then following the Yes branch of step 1212, at step 1214 a determination is performed if a request as to getting or setting a primary display is received. A request may be received from upstream display as to an ALS primary display preference, if necessary. A message with the request can be sent. The downstream may be set as ALS follower by the upstream display.

If no request is received as to getting or setting a primary display, following the No branch of step 1214, at step 1216, the process 1200 ends. The process 1200 may end due to a time out. If a request is received as to getting or setting a primary display, following the Yes branch of step 1218, step 1218 is performed.

At step 1218, if the upstream display cluster does not have an existing primary display, a get primary display preference message would be received. In this case, a reply is sent by the downstream display to the upstream display to indicate its primary display preference. If a primary display exists in the upstream display cluster, a set follower display request would be received instead. In this case, the downstream display would set itself as a follower display and propagate the same request downstream if required. At step 1216, the process 1200 ends.

Figure 13:
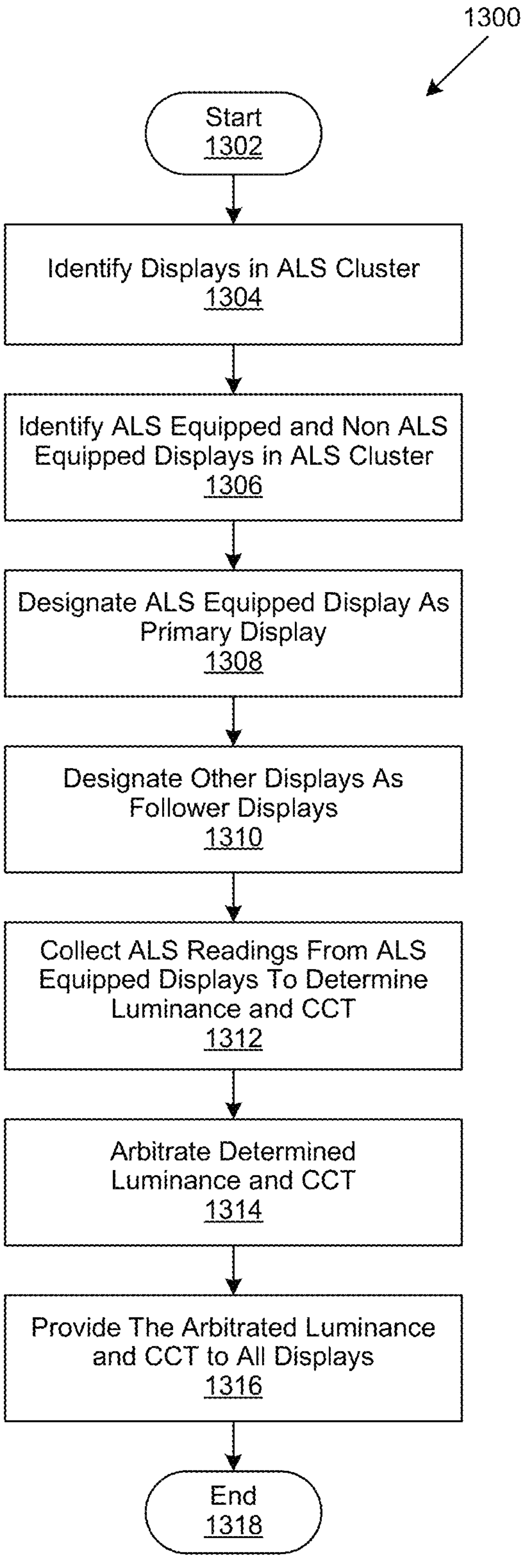
FIG. 13 is a generalized flowchart for synchronizing adaptive luminance and color controls of multiple displays of an information handling system.

FIG. 13 is a generalized flowchart for synchronizing adaptive luminance and color controls of multiple displays of an information handling system. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. In certain implementations, the display ambient lighting control (ALS software) 124 described in FIG. 1 can be used to perform steps of the described method/process.

At step 1302, the process 1300 starts. At step 1304, the displays in an ALS cluster are identified. At step 1306, the displays in the ALS cluster are identified as ALS equipped display or non ALS equipped display. At step 1308, an ALS equipped display is designed as a primary display in the ALS cluster. At step 1310, the other displays in the ALS cluster are designated as follower displays. At step 1312, ALS readings are collected from the ALS equipped displays to determine luminance (brightness) and CCT (color tone/Correlated Color Temperature). At step 1314, arbitrating is performed of the determined luminance and CCT. At step 1316, the arbitrated luminance and CCT are provided to the displays of the ALS cluster for use. At step 1318, the process 1300 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram step or steps.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A method for synchronizing adaptive luminance and color controls of multiple displays comprising:

identifying displays in an ambient light sensor (ALS) cluster;

identifying which displays in the ALS cluster are ALS equipped and non ALS equipped;

designating an ALS equipped display as a primary display of the ALS cluster;

designating the other displays as follower displays of the ALS cluster;

collecting ALS readings from the ALS equipped displays to determine luminance and color tone;

arbitrating the determine luminance and color tone; wherein the luminance and color tone are based on essential parameters and advance parameters in an ALS control behavior set, wherein essential parameters include a) Minimum luminance (Lum_min), max luminance (Lum_max), in nits; b) Minimum correlated color temperature (CCT_min), maximum correlated color temperature (CCT_max), in Kelvin; c) Luminance control step size (Lum_step), in nits and speed (Lum_speed), in nits/sec; d) Correlated color temperature control step size (CCT_speed), in Kelvin and speed (CCT_speed), in Kelvin/sec; e) ALS role: ALS Primary or ALS Follower; and advance parameters include: a) luminance control multi-segment mapping points (Lum_1 . . . n) color temperature control multi-segment mapping points (CCT_1 . . . n); and providing the arbitrated luminance and color tone to all the displays in the ALS cluster.

2. The method of claim 1, wherein the ALS cluster is connected to an information handling system (IHS) and the IHS performs the steps of claim 1.

3. The method of claim 1, wherein the ALS cluster is daisy chained, and the primary display performs the steps of claim 1.

4. The method of claim 1, wherein the luminance and color tone are based on essential and advance parameters in an ALS control behavior set.

5. The method of claim 1, wherein the displays in the ALS cluster communicate through Multi-Monitor Sync (MMS) protocol.

6. The method of claim 1 further comprising designating a different primary display.

7. The method of claim 6, wherein advance parameters are provided after primary display change.

8. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations for synchronizing adaptive luminance and color controls of multiple displays, and comprising instructions executable by the processor and configured for:

identifying displays in an ambient light sensor (ALS) cluster;

identifying which displays in the ALS cluster are ALS equipped and non ALS equipped;

designating an ALS equipped display as a primary display of the ALS cluster;

designating the other displays as follower displays of the ALS cluster;

collecting ALS readings from the ALS equipped displays to determine luminance and color tone;

arbitrating the determine luminance and color tone; wherein the luminance and color tone are based on essential parameters and advance parameters in an ALS control behavior set, wherein essential parameters include a) Minimum luminance (Lum_min), max luminance (Lum_max), in nits; b) Minimum correlated color temperature (CCT_min), maximum correlated color temperature (CCT_max), in Kelvin; c) Luminance control step size (Lum_step), in nits and speed (Lum_speed), in nits/sec; d) Correlated color temperature control step size (CCT_speed), in Kelvin and speed (CCT_speed), in Kelvin/sec; e) ALS role: ALS Primary or ALS Follower; and advance parameters include: a) luminance control multi-segment mapping points (Lum_1 . . . n) color temperature control multi-segment mapping points (CCT_1 . . . n); and providing the arbitrated luminance and color tone to all the displays in the ALS cluster.

9. The system of claim 8, wherein the ALS cluster is connected to an information handling system (IHS) and the IHS performs the steps of claim 8.

10. The system of claim 8, wherein the ALS cluster is daisy chained, and the primary display performs the steps of claim 8.

11. The system of claim 8, wherein the luminance and color tone are based on essential and advance parameters in an ALS control behavior set.

12. The system of claim 8, wherein the displays in the ALS cluster communicate through Multi-Monitor Sync (MMS) protocol.

13. The system of claim 8 further comprising designating a different primary display.

14. The system of claim 13, wherein advance parameters are provided after primary display change.

15. A non-transitory, computer-readable storage medium embodying computer program code for message serialization and deserialization, the computer program code comprising computer executable instructions configured for synchronizing adaptive luminance and color controls of multiple displays comprising:

identifying displays in an ambient light sensor (ALS) cluster;

identifying which displays in the ALS cluster are ALS equipped and non ALS equipped;

designating an ALS equipped display as a primary display of the ALS cluster;

designating the other displays as follower displays of the ALS cluster;

collecting ALS readings from the ALS equipped displays to determine luminance and color tone;

arbitrating the determine luminance and color tone; wherein the luminance and color tone are based on essential parameters and advance parameters in an ALS control behavior set, wherein essential parameters include a) Minimum luminance (Lum_min), max luminance (Lum_max), in nits; b) Minimum correlated color temperature (CCT_min), maximum correlated color temperature (CCT_max), in Kelvin; c) Luminance control step size (Lum_step), in nits and speed (Lum_speed), in nits/sec; d) Correlated color temperature control step size (CCT_speed), in Kelvin and speed (CCT_speed), in Kelvin/sec; e) ALS role: ALS Primary or ALS Follower; and advance parameters include: a) luminance control multi-segment mapping points (Lum_1 . . . n) color temperature control multi-segment mapping points (CCT_1 . . . n); and providing the arbitrated luminance and color tone to all the displays in the ALS cluster.

16. The non-transitory, computer-readable storage medium of claim 15, wherein the ALS cluster is connected to an information handling system (IHS) and the IHS performs the steps of claim 15.

17. The non-transitory, computer-readable storage medium of claim 15, wherein the ALS cluster is daisy chained, and the primary display performs the steps of claim 15.

18. The non-transitory, computer-readable storage medium of claim 15, wherein the luminance and color tone are based on essential and advance parameters in an ALS control behavior set.

19. The non-transitory, computer-readable storage medium of claim 15, wherein the displays in the ALS cluster communicate through Multi-Monitor Sync (MMS) protocol.

20. The non-transitory, computer-readable storage medium of claim 15 further comprising designating a different primary display.

* * * * *